United States Patent
Deloubes

(10) Patent No.: US 10,106,262 B2
(45) Date of Patent: Oct. 23, 2018

(54) DEVICE FOR ATTACHING AN APPARATUS ONTO A PANEL

(71) Applicant: SOGECLAIR S.A., Saint Jean (FR)

(72) Inventor: Mathieu Deloubes, Bretx (FR)

(73) Assignee: SOGECLAIR S.A., Saint Jean (FR)

( * ) Notice: Subject to any disclaimer, the term of this patent is extended or adjusted under 35 U.S.C. 154(b) by 822 days.

(21) Appl. No.: 14/387,586

(22) PCT Filed: Mar. 29, 2013

(86) PCT No.: PCT/EP2013/000958
§ 371 (c)(1),
(2) Date: Sep. 24, 2014

(87) PCT Pub. No.: WO2013/143709
PCT Pub. Date: Oct. 3, 2013

(65) Prior Publication Data
US 2015/0047197 A1    Feb. 19, 2015

(30) Foreign Application Priority Data

Mar. 30, 2012 (FR) ...................................... 12 00966

(51) Int. Cl.
*B64D 11/06* (2006.01)
*B60P 7/08* (2006.01)

(52) U.S. Cl.
CPC ........ *B64D 11/0696* (2013.01); *B60P 7/0807* (2013.01); *B60P 7/0815* (2013.01); *Y02T 50/46* (2013.01); *Y10T 29/49622* (2015.01)

(58) Field of Classification Search
CPC .. B64D 11/0696; B60P 7/0807; B60P 7/0815; Y10T 29/49622; Y02T 50/46
(Continued)

(56) References Cited

U.S. PATENT DOCUMENTS

| 3,377,039 | A | * | 4/1968 | Hayes | B60P 7/0807 410/112 |
| 3,381,925 | A | * | 5/1968 | Higuchi | B60P 7/0807 410/116 |

(Continued)

FOREIGN PATENT DOCUMENTS

| CA | 2820346 A1 | * 12/2013 | ............ B60P 7/0807 |
| DE | 102007036449 A1 | 2/2009 | |

(Continued)

*Primary Examiner* — Christopher M Koehler
*Assistant Examiner* — Joel Crandall
(74) *Attorney, Agent, or Firm* — Defillo & Associates, Inc.; Evelyn A Defillo

(57) ABSTRACT

The invention relates to a device (100) for attaching an apparatus onto a panel including at least one mortise, characterized in that it includes: a clamping member (102) including a clamping jaw (105) shaped so as to be capable of engaging with a first surface opposite the panel; and an anchoring dowel (108) rotatably secured to the clamping member (102) and including an anchoring jaw (109) capable of engaging with a second coupling surface of the panel, the clamping member (102) being capable of being translatably moved relative to the anchoring dowel (108) between: a position for blocking the attachment device (100), in which the clamping jaw (105) and the anchoring jaw (109) engage so as to attach the attachment device (100) to the panel; and a position for installing the attachment device (100), in which the clamping jaw (105) is shaped so as to be capable of passing through the attachment mortise of the panel.

11 Claims, 6 Drawing Sheets

(58) Field of Classification Search
USPC .................................. 269/55; 410/116, 104
See application file for complete search history.

(56) References Cited

U.S. PATENT DOCUMENTS

| | | | | | |
|---|---|---|---|---|---|
| 4,457,650 | A | * | 7/1984 | Tseng | B60P 7/132 |
| | | | | | 24/265 CD |
| 4,630,982 | A | * | 12/1986 | Fenner | B61D 45/001 |
| | | | | | 24/265 CD |
| 4,762,449 | A | * | 8/1988 | St. Pierre | B60P 7/0807 |
| | | | | | 248/499 |
| 4,948,311 | A | * | 8/1990 | St. Pierre | B60P 7/0807 |
| | | | | | 248/499 |
| 7,481,610 | B1 | * | 1/2009 | Egigian | B60P 7/0807 |
| | | | | | 410/106 |
| 7,517,181 | B2 | * | 4/2009 | Dunaway | G09F 3/0305 |
| | | | | | 410/104 |
| 7,980,798 | B1 | * | 7/2011 | Kuehn | B60P 7/0815 |
| | | | | | 410/104 |
| 2004/0131440 | A1 | * | 7/2004 | Womack | B60P 7/0815 |
| | | | | | 410/104 |
| 2007/0122254 | A1 | | 5/2007 | Laconte | |
| 2007/0231100 | A1 | * | 10/2007 | Sherman | B60P 7/0815 |
| | | | | | 410/104 |
| 2010/0202850 | A1 | * | 8/2010 | Parsons | B61D 45/001 |
| | | | | | 410/104 |

FOREIGN PATENT DOCUMENTS

| | | | | |
|---|---|---|---|---|
| EP | 1902899 A1 | * | 3/2008 | ............ B60P 7/0807 |
| EP | 3153355 A1 | * | 4/2017 | ............ B60P 7/0807 |
| FR | 2606097 | | 5/1988 | |
| FR | 2900125 | | 10/2007 | |
| FR | 2993523 A1 | * | 1/2014 | ............ B60P 7/0807 |

* cited by examiner

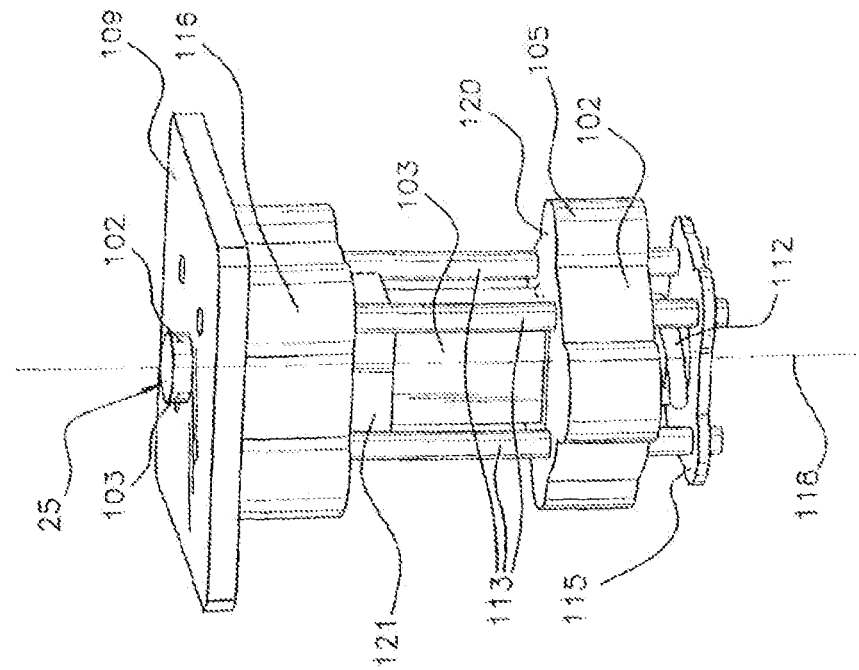
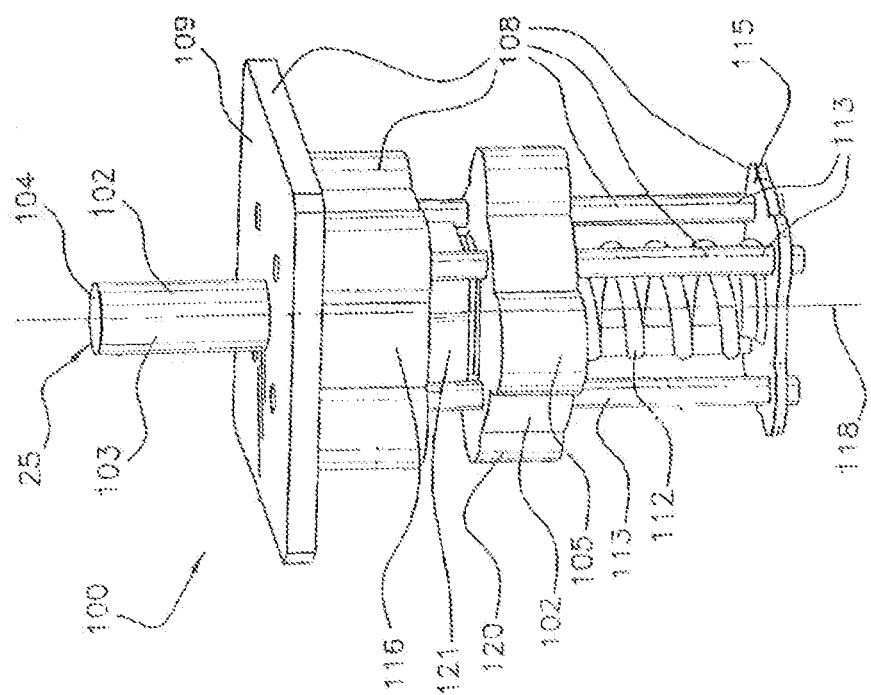

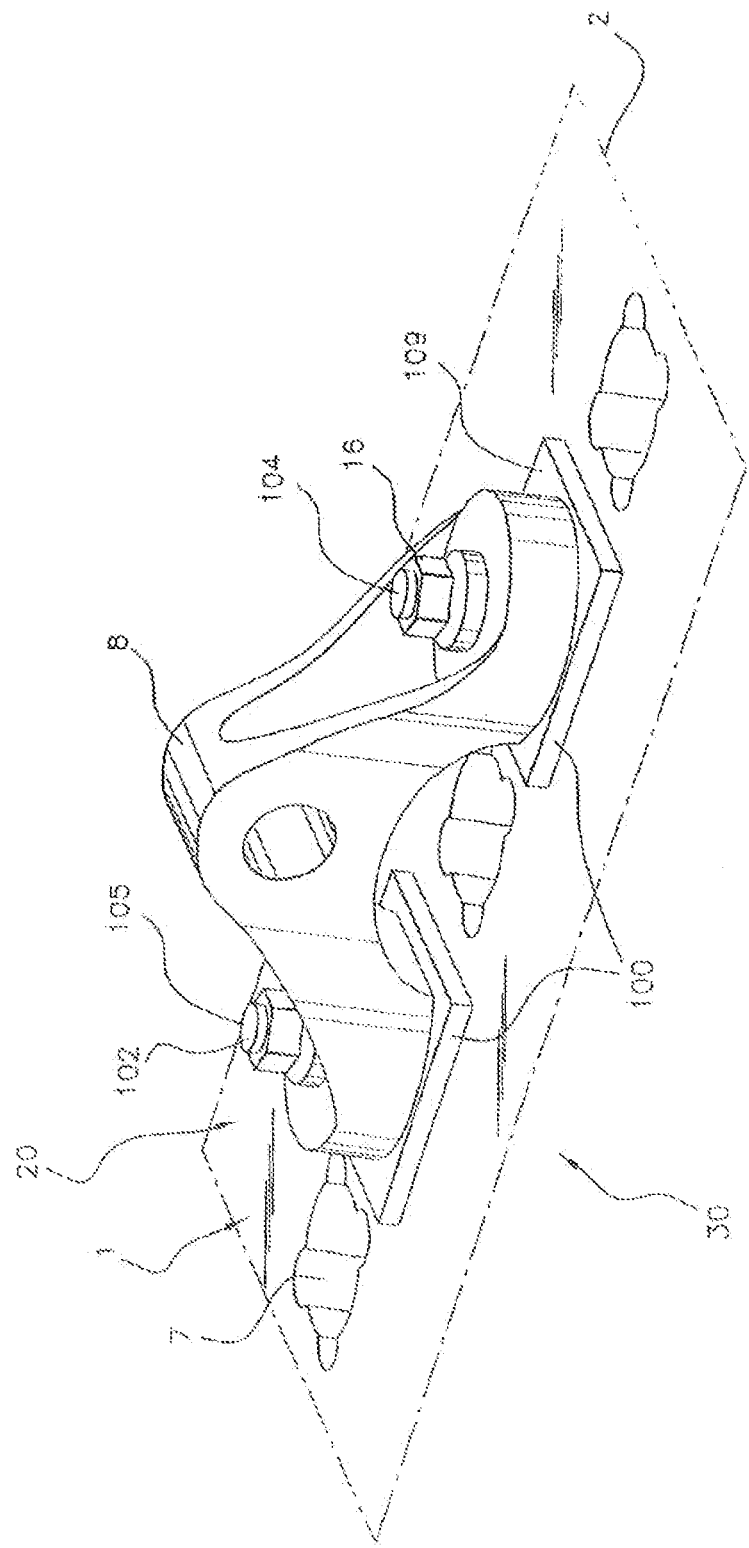

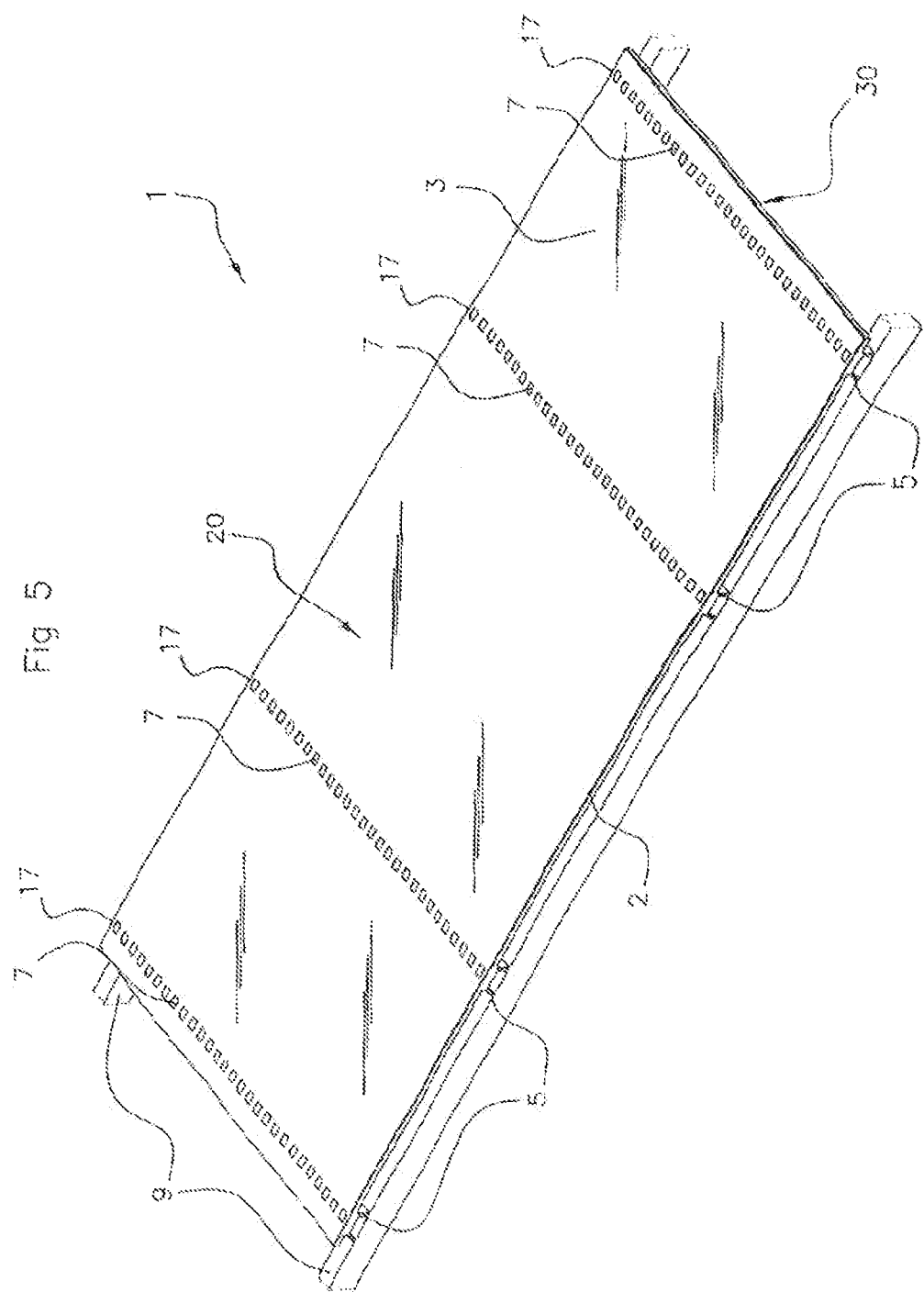

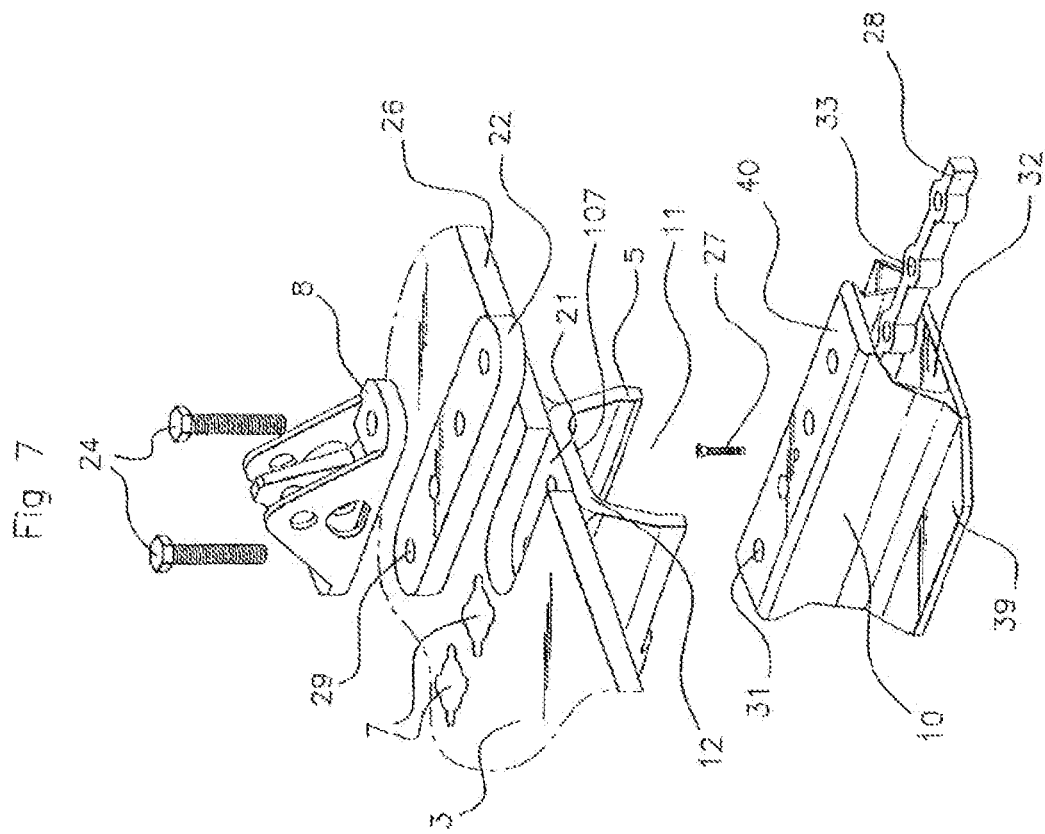
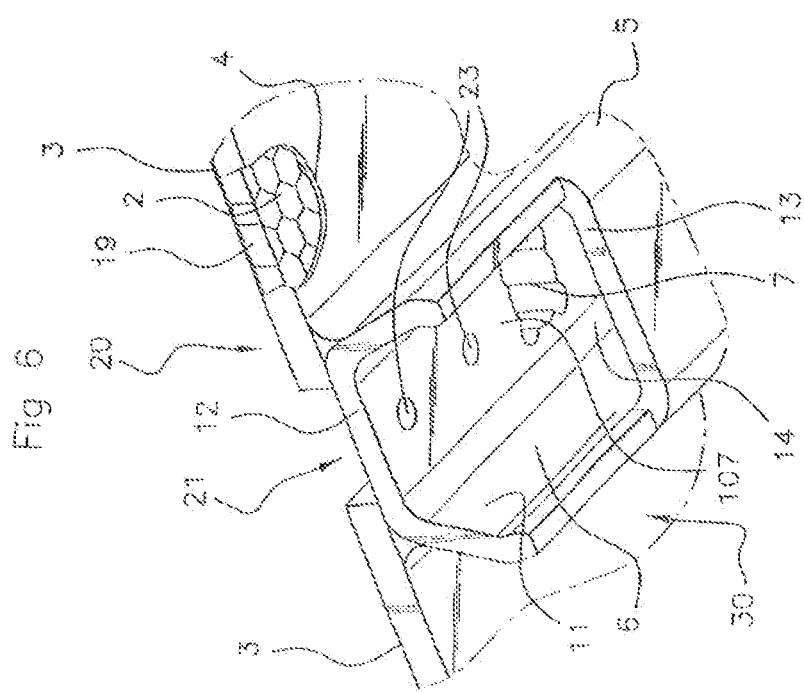

DEVICE FOR ATTACHING AN APPARATUS ONTO A PANEL

CROSS REFERENCE TO RELATED APPLICATION

This application is a national stage entry of PCT/EP2013/000958 filed Mar. 29, 2013, under the International Convention claiming priority over French Patent Application No. 12/00966 filed Mar. 30, 2012.

TECHNICAL FIELD

The invention concerns a device for fastening a fitting to a panel—in particular to a floor panel of a transport vehicle. In particular, the invention relates to such a device for removably fastening a fitting to a floor panel, for example of an aircraft. The invention furthermore concerns a method for assembling a fitting on a panel and a panel comprising such a fastening device.

A transport vehicle comprises an internal space, for example a passenger cabin or a hold for transporting freight. In particular, a vehicle for transporting passengers—in particular an aircraft—comprises a cabin in which a plurality of rows of seats for passengers are lined up. The seats for passengers and the cabin furniture of the aircraft are fastened to elements of the primary structure of the aircraft by way of rails that extend generally parallel to the axis of movement of the aircraft.

In general, in an aircraft, the rails rest on crossbeams that form the primary structure of the aircraft and extend approximately parallel to one another and transversely to the longitudinal axis of the aircraft. Thus, the rails of the floor, which extend parallel to the longitudinal axis of the aircraft, are mounted in a fixed manner on the primary structure of the aircraft. The rails allow cabin equipment, for example seats, galleys, furniture and/or goods loaded, to be fastened.

PRIOR ART

FR 2 900 125 discloses an aircraft floor having a plurality of lateral and central rails that are parallel to one another and extend longitudinally through an aircraft portion. Each rail is mounted securely on a plurality of adjacent crossbeams of the aircraft. The rails are fastened to each of the crossbeams of the structural framework of the aircraft by way of screws passing through housings formed in the rail and in the crossbeam, respectively. Each rail forms a longitudinal slideway and furthermore has two substantially flat lateral flanges that are designed to receive two floor panels. Each floor panel comprises a generally honeycomb structure and is fastened, generally by means of screws and nuts, to one of the flat lateral flanges of the rail.

Such a rail for fastening a cabin fitting to a floor of an aircraft takes up a predetermined position in the aircraft. This predetermined position is dictated by the dimensions of the floor panels resting on fastening rails.

Such fastening rails are rigid, bulky and do not allow the installation of a transport vehicle floor that has a high degree of modularity. The position of such fastening rails also has to be predetermined so as to be able to receive floor panels which are generally rectangular in shape.

SUMMARY OF THE INVENTION

The invention aims to remedy all of the above mentioned drawbacks.

In particular, the invention relates to a device for fastening a fitting to a panel—in particular to a floor panel of a transport vehicle—said device not requiring the installation of rails for fastening seats and/or furniture.

The invention also relates to such a device for fastening a fitting to a panel which is removable and reusable after removal for subsequently fastening a fitting to the same panel or to a different panel.

Moreover, the invention relates to a device for fastening a fitting to a panel that is designed to be able to be used on a panel of which only one of the two main faces is accessible—in particular easily accessible.

In particular, the invention relates to such a device for fastening a fitting to a panel—in particular to a floor panel of a transport vehicle—that allows the transport vehicle floor to be laid more easily.

Thus, the invention relates to a device for fastening a fitting to a panel which is of any shape.

The invention also relates to such a device for fastening a fitting to a panel—in particular to a floor panel of a transport vehicle—which has a reduced weight compared with floors comprising fastening rails.

Moreover, the invention relates to such a device for fastening a fitting to a panel—in particular to a floor panel of a transport vehicle—that is designed to be able to simplify the construction and laying of the transport vehicle floor.

The invention relates to such a device for fastening a fitting to a panel for a transport vehicle floor which is easy to fit in a transport vehicle and which does not require said floor panel to be inserted into the gap between two adjacent parallel rails nor the dimensions of said panel to be adapted to the dimensions of this gap.

In particular, the invention relates to such a device for fastening a fitting to a panel—in particular a floor panel for an aircraft—that is able to be fastened to said panel once the panel has been definitively installed.

The invention thus relates to such a device for fastening a fitting to a panel—in particular to a floor panel for a transport vehicle—which allows a greater degree of modularity and an increased number of variants in the layout of the transport vehicle cabin.

The invention also relates to such a device for fastening a fitting to a panel which meets the requirements of mechanical strength, fire resistance and reduction in smoke emission in the event of fire that are recommended in particular in the aeronautical field.

The invention relates to such a device for fastening a fitting to a panel that is designed to allow easier installation in the cabin of said transport vehicle.

The invention additionally aims to provide such a device for fastening a fitting to a panel which preserves the working routines of personnel, which allows the device for fastening a fitting to a panel to be mounted and removed more easily, and which involves only a few manipulations in order to be employed.

To this end, the invention concerns a device for fastening a fitting to a main face, known as the attachment face, of a panel comprising at least one mortise that passes through said panel and opens out onto said attachment face, and a main face, known as the opposite face, that lies on the opposite side from the attachment face, the fastening device having a longitudinal axis and being characterized in that it comprises:

a clamping member comprising a jaw, known as the clamping jaw, which is shaped to be able to pass through the mortise and to be able to bear against the opposite face, and comprising means for attaching the fitting to the attachment face; and a peg for anchoring the fastening device in the panel, said peg rotating as one with the clamping member about the longitudinal axis of the fastening device and comprising a jaw, known as the anchoring jaw, which is designed to be able to bear against the attachment face;

said clamping member being designed to be able to be moved translationally with respect to the anchoring peg along the longitudinal axis between:

a position, known as the blocking position, of the fastening device, in which the clamping jaw and the anchoring jaw have been moved toward one another by elastic return means and are in contact with the two main faces of the panel; and a position, known as the installation position, of the fastening device, in which the clamping jaw and the anchoring jaw have been spaced apart from one another with respect to the blocking position so as to allow the fastening device to rotate about the longitudinal axis.

In all of what follows:

the term "one-piece" denotes a panel formed in a single piece, that is to say which cannot be separated into a plurality of distinct and separate elements without breaking or damaging said one-piece panel. In particular, such a one-piece panel is not disassemblable into a plurality of elements that are separable from one another;

the terms "lower" and "upper" are to be understood with respect to a panel as positioned in a transport vehicle, the upper main face of said one-piece panel being oriented upward and the lower main face being oriented downward. Thus, a one-piece panel according to the invention that is stored with a view to being subsequently installed so as to form a transport vehicle floor, or following its removal from a transport vehicle floor, has a lower main face from which at least one beam leads or extends and an upper main face that does not have such a beam and is designed to allow users of the transport vehicle to move around;

the expression "structural framework" or "primary structure" of a transport vehicle—in particular a vehicle for waterway or maritime transport (for example a ferry, a liner or a cargo vessel), a vehicle for railroad transport, a vehicle for road transport and an aircraft—represent the elements of a transport vehicle which provide it with its rigidity, strength and shape;

the term "self-supporting" describes a board which has sufficient flexural rigidity and is designed in particular to be able to support its own weight without deformation, in particular when said self-supporting board is resting on two crossbeams that are approximately parallel to one another.

The invention thus consists in providing a device for fastening a fitting to a panel which is removable and reusable.

Advantageously, the longitudinal axis of the fastening device extends along the axis of elongation of the fastening device and along the axis of relative translational movement of the anchoring peg—in particular of the anchoring jaw—and of the clamping member—in particular of the clamping jaw.

In its blocking position, the fastening device has a clamping jaw that extends from the opposite face of the panel and an anchoring jaw that extends from the attachment face of the panel, said clamping jaw and anchoring jaw being returned elastically toward one another so as to clamp the panel and fasten the fastening device to the panel. In its installation position, the fastening device has a clamping jaw that is oriented so as to be able to be introduced into the mortise in the panel on its attachment face, to be able to pass through said panel and to be able to emerge from the opposite face of the panel, the anchoring jaw being retained on the attachment face of the panel.

Advantageously, the clamping jaw of the fastening device according to the invention has means that are designed to be able to retain said clamping jaw on the opposite face of the panel when the fastening device is in the blocking position and to allow the clamping jaw to move translationally in the mortise in the panel when the fastening device is in the installation position, said clamping jaw and the anchoring jaw being maintained so as to rotate as one.

Advantageously, in the blocking position, the clamping jaw and the anchoring jaw are returned toward one another by elastic return means and are in contact with the two main faces of the panel and cooperate in order to fasten the fastening device to the panel and to allow the fitting to be fastened to the clamping member of the fastening device.

A fitting is understood to be any object that is able to be fastened to a panel. A fastening device according to the invention is particularly advantageous for fastening a fitting to a panel of which only one face—the attachment face—is accessible to the user. In particular, the fitting may be formed by any item of furniture or any seat present in an aircraft.

Advantageously, in a first variant according to the invention, the clamping jaw is a piece that is shaped with a shape that is designed to be able to allow the clamping jaw to move in translation in the mortise in the panel when the fastening device is in the installation position and to be able to block the clamping jaw on the opposite face of the panel when the fastening device is in the blocking position, in particular after the fastening device has been rotated about an axis perpendicular to the main faces of the panel and through a non-zero angle from its installation position.

Advantageously, the clamping member is made of a metal material, in particular titanium.

Advantageously, the anchoring peg is made of at least one material chosen from the group formed by polymeric materials—in particular thermoplastic materials—and metal materials—in particular aluminum.

Advantageously, the anchoring jaw is formed by a plate, known as the anchoring support plate, having orifices that pass through said support plate and are designed to allow the fastening device to be extracted from the mortise.

Advantageously and according to the invention, the clamping member comprises a cylindrical rod passing through a bore in the anchoring jaw and having a first longitudinal end that protrudes from the anchoring peg at least in the blocking position of the fastening device, said first longitudinal end being designed to allow said fitting to be fastened to the panel, the clamping jaw being secured to the cylindrical rod and lying at a second longitudinal end of the cylindrical rod.

In a fastening device according to the invention, the clamping member is designed to be able to exert a clamping force on the panel on either side of a mortise in cooperation with the anchoring jaw of the anchoring peg and to be able to fasten a fitting to be assembled with said panel or to be attached to said panel.

In a fastening device according to the invention, the cylindrical rod of the clamping member is a solid and rigid rod that is designed to be able to guide the translational movement of the clamping member with respect to the anchoring peg. The cylindrical rod is a rigid rod having any shape in cross section. The cross section of the cylindrical rod may have a circular shape. In this variant, the guiding means allow the anchoring peg and the clamping member to rotate as one.

It is possible for the cylindrical rod to have, along at least a portion of its length, a cross section with a polygonal, in particular square, shape. In this variant, the cylindrical rod of the clamping member allows the clamping jaw of the clamping member and the anchoring jaw of the anchoring peg to rotate as one.

Advantageously and according to the invention, the bore in the anchoring jaw is designed to receive the cylindrical rod of the clamping member and to allow said cylindrical rod to move translationally in the bore in the anchoring jaw between the blocking position and the installation position of the fastening device. The clamping member is thus guided translationally in the bore in the anchoring jaw between the blocking position and the installation position of the fastening device.

Advantageously and according to the invention, the anchoring peg comprises means for guiding the clamping jaw translationally between the blocking position and the installation position of the fastening device.

Advantageously and according to the invention, the guiding means comprise guiding rods that extend between the clamping jaw and a holder for the anchoring peg. The anchoring peg advantageously comprises an anchoring jaw and guiding means formed by rigid guiding rods that extend securely between the anchoring jaw and the holder for the anchoring peg. The holder has a shape designed to be able to pass through the mortise in the panel. In particular, the shape of the holder does not extend beyond the shape in cross section of the clamping jaw.

Advantageously and according to the invention, the elastic means comprise at least one compression spring that extends between the holder for the anchoring peg and the clamping jaw of the clamping member.

The compression spring is designed to be able to return the clamping jaw and the anchoring jaw toward one another when the device is in a blocking position fastened to a panel or in a rest position when the fastening device is not used and, by exerting a force on the clamping member, to place the fastening device in its installation position with a view to its installation.

Advantageously and according to the invention, the anchoring peg comprises an error-proofing feature for guiding the anchoring peg into the mortise, extending from the face of the anchoring jaw, rotating as one with the anchoring jaw and facing the clamping jaw, said error-proofing feature having a hole that coaxially extends the bore in the anchoring jaw and is designed to receive the cylindrical rod of the clamping member and to allow said cylindrical rod to move between the blocking position and the installation position of the fastening device.

Advantageously and according to the invention, the anchoring jaw is formed by a support plate, known as the anchoring support plate, for bearing against the attachment face of the panel when the fastening device is in the blocking position, and the error-proofing feature has a cylindrical shape and, in cross section perpendicular to the longitudinal axis of the fastening device, has an external contour inscribed in a mortise in the panel.

Advantageously, the external envelope of the error-proofing feature has a cylindrical shape. This external envelope is in particular shaped so as to engage with the internal surface of the mortise in the panel and in order to prevent the fastening device from rotating in said mortise.

Advantageously and according to the invention, the error-proofing feature has an external envelope shaped to be able to engage in movement in the mortise perpendicularly to the main faces of the panel and to be able to prevent the fastening device from rotating with respect to the panel about an axis perpendicular to the main faces of the panel.

Advantageously and according to the invention, the first longitudinal end of the cylindrical rod is a threaded rod. When the fastening device is in the blocking position on the panel, the threaded rod of the fastening device according to the invention lies on the attachment face of said panel. It thus allows an aircraft cabin fitting, a seat or any other fitting to be fastened, for example by means of a nut.

Advantageously and according to the invention, the threaded rod of a fastening device according to the invention is designed to allow a support yoke for a fitting to be fastened. As a variant, such a support yoke for a fitting is advantageously fastened to two fastening devices according to the invention in the blocking position in two mortises. Advantageously, the two fastening devices are carried by a single panel. It is also possible for the two fastening devices to be carried by two adjacent panels, the support yoke for a fitting contributing to the assembly of the two adjacent panels.

Advantageously and according to the invention, the clamping jaw and the error-proofing feature have an identical external contour in cross section with respect to the axis of elongation of the fastening device and approximately parallel to an axis perpendicular to the two main faces of the panel.

In this advantageous variant according to the invention, the error-proofing feature and the clamping jaw are rotationally offset such that the error-proofing feature is designed to be able to prevent the fastening device from rotating in the mortise and such that the clamping jaw is rotationally offset with respect to the mortise and exerts a blocking force on the fastening device.

Advantageously and according to the invention, the clamping jaw and the error-proofing feature have a quatrefoil external contour in cross section. Advantageously, the error-proofing feature and the clamping jaw are rotationally offset by an angle with a value suitable for clamping and blocking the fastening device on the panel. This angle value is non-zero and can advantageously be around 45°. In this configuration, each lobe of the clamping jaw is designed to be able to bear against the opposite face of the panel, the fastening device then being in the blocking position.

Advantageously and according to the invention, the clamping jaw and the error-proofing feature have contours that differ from one another by rotation through a non-zero angle when their cross sections are projected on a plane at right angles to the longitudinal axis of the cylindrical rod.

Advantageously and according to the invention, the panel is a panel for the floor of a transport vehicle and comprises a self-supporting board having a first main face, known as the upper face, of the self-supporting board that is designed to be able to allow a user to move around on the floor of said transport vehicle.

Advantageously and according to the invention, the panel is a one-piece panel comprising at least one beam for increasing the bending strength of the one-piece panel along a main axis of said one-piece panel, each beam being secured to the self-supporting board and having an axis of elongation that extends parallel to at least one of the main faces of the self-supporting board.

The invention thus aims to provide a device for fastening a fitting to a one-piece panel of a transport vehicle floor, said one-piece panel being designed to be able to decrease the weight of the floor while preserving the mechanical strength properties, which are in particular designed to allow the use of such a one-piece panel in a transport vehicle floor.

Advantageously, the self-supporting board is formed from a material, known as a core material, designed to have compressive strength—in particular without substantial deformation—which is sufficient to allow the installation of items of furniture resting on at least one one-piece panel of the transport vehicle floor.

Advantageously, the self-supporting board is formed from a core made of transparent thermoplastic material, in particular polymethyl methacrylate (PMMA), which is known under the name Plexiglas®.

Advantageously, the combination of the self-supporting board and the beam(s) makes it possible to form a one-piece panel having at the same time impact strength and flexural modulus of elasticity that are high and suitable for use as a transport vehicle floor.

Moreover, such a one-piece panel with improved mechanical strength (impact strength and flexural elasticity) nevertheless has a small size—in particular a small thickness—and is in any case compatible with the size constraints encountered in an aircraft cabin. In particular, such a one-piece panel makes it possible to use a rigid core of reduced thickness. In particular, such a one-piece panel is designed to be able to do away with the use of prior art fastening rails for seats.

In particular, such a one-piece panel is designed to be able to be mounted on at least one element of the structural framework of an aircraft without requiring the use of fastening rails for seats and/or furniture.

Advantageously, a plurality of one-piece panels according to the invention make it possible to produce a transport vehicle floor which is flat, while using a plurality of one-piece panels, each of the self-supporting boards of the plurality of one-piece panels having a different thickness and a different mechanical strength. A one-piece panel according to the invention forms a modular element of the transport vehicle floor in that it allows the mechanical properties of said one-piece panel to be adapted without modifying the thickness of the one-piece panel. Such a one-piece panel allows a variable layout of the internal volume of the transport vehicle.

Advantageously and according to the invention, the self-supporting board comprises a core—in particular a honeycomb core—, a skin, known as the cabin skin, that extends over the surface and is secured to a first main face of the core, in particular the honeycomb core,—in particular designed to be able to allow a user to move around on the floor of said transport vehicle—and means for assembling—in particular by adhesive bonding—the cabin skin and the core—in particular the honeycomb core.

Advantageously and according to the invention, the self-supporting board comprises a skin, known as the lower skin, that extends over the surface and is secured to a second main face of the core—in particular the honeycomb core—and means for assembling—in particular by adhesive bonding—the lower skin and the core—in particular the honeycomb core.

Advantageously, in a one-piece panel according to the invention, the cabin skin and/or the lower skin is (are) formed from a rigid material. In particular, the rigid material forming the cabin skin is designed to allow a user to move around on the floor of said transport vehicle.

Advantageously, in a one-piece panel according to the invention, the cabin skin is formed from a material chosen from the group formed by metal materials (for example aluminum or steel), composite materials comprising a filler—in particular a unidirectional ply or a fabric—chosen from the group formed by carbon fillers, glass fillers, aramid fillers (aromatic polyamide), fillers made of natural fibers—in particular bamboo fibers—and a resin chosen from the group formed by thermoplastic resins, for example resins of the polyether imide (PEI) type, resins of the ultra-dense polyether imide type, resins of the polypropylene sulfone (PPS) type, resins of the polyether ether ketone (PEEK) type and thermosetting resins, for example epoxy resins and phenolic resins. In particular, such a cabin skin provides good mechanical strength and a reduced weight.

Advantageously, the cabin skin and the lower skin are formed from the same material.

Advantageously, the cabin skin is itself a rigid skin (sheet) and is designed to be able to undergo acceptable elastic deformation—in particular bending. However, the cabin skin may itself have a certain degree of flexibility, in particular in terms of elastic bending deformation along the long dimension of the skin. In this case, the assembly of the cabin skin and the rigid core confers its rigidity on the one-piece floor panel.

Advantageously, the self-supporting board comprises at least one core material chosen from the group formed by a honeycomb core, a foam, a lattice, a woven core and a nonwoven core.

Advantageously, the self-supporting board may be formed from a honeycomb core. Advantageously, the honeycomb core may be formed from any appropriate rigid material, in particular from a material chosen from the group formed by aluminum, aluminum alloys, poly-paraphenylene terephthalamide (known in particular under the name Kevlar®), a thermoplastic material—in particular partially crosslinked or noncrosslinked polypropylene —, PVC and polycarbonate. Advantageously, the material forming the honeycomb core may be a material that has been subjected to a surface treatment so as to render it impermeable to gases and/or liquids.

Advantageously, the honeycomb core may be formed by an assembly of materials. Advantageously, the honeycomb core may be formed from a peripheral rigid structure, also known as a skeleton, and cells (or hollow bodies, cavities or pores). In this particular embodiment, the open cells form a spacer preventing the deformation of the cabin skin under the weight of the passengers or furniture.

Advantageously, the honeycomb core consists of a material having cavities or pores passing through the thickness of the honeycomb core and opening out onto the two main faces of the honeycomb core.

Advantageously, the self-supporting board may consist of a solid foam chosen from the group formed by open-cell foams and closed-cell foams. Advantageously, the solid foam is chosen from the group formed by polyurethane foams, aluminum foams, carbon foams, thermosetting foams, thermoplastic foams and balsa foams.

Advantageously, the self-supporting board is chosen from the group formed by rigid honeycomb cores, rigid cores made of rigid foam and rigid cores consisting of a plurality of rigid foam elements.

Advantageously, the self-supporting board may consist of a plurality of rigid foam elements, said rigid foam elements being adhesively bonded to one another so as to form the rigid core of the one-piece panel. Advantageously, with each of the rigid foam elements having an elongate shape and having a cross section with a trapezoidal shape, said rigid foam elements are joined together so as to form the self-supporting board.

Advantageously, the beam consists of a solid material chosen from the group formed by metal materials, thermosetting materials and thermoplastic materials. In particular, the beam consists of a solid thermosetting material comprising a fire-resistant epoxy resin that does not generate smoke in the event of its combustion.

Advantageously, the self-supporting board and the beam are joined together by adhesive bonding between the self-supporting board and the beam. It is also possible for the self-supporting board and the beam to be joined together by adhesive bonding between a skin, known as the lower skin, extending over the lower surface of the self-supporting board—in particular of the honeycomb core—and the beam.

Advantageously, the one-piece board comprises a quantity, at least partially filling at least one cell of the honeycomb core, of a reinforcing material chosen from the group formed by thermosetting resins—in particular epoxy resins, phenolic resins and foams. In particular, such a one-piece panel comprises such a reinforcing material filling the cells of the honeycomb core lying next to at least one beam portion of said one-piece panel, said quantity of thermosetting material being suitable for reinforcing the mechanical strength of the one-piece panel.

Advantageously and according to the invention, the beam protrudes and is in contact with one of the two main faces of the self-supporting board—in particular of the honeycomb core.

In a one-piece panel according to the invention, the beam protrudes from the surface and is in contact with one of the two main surfaces of the self-supporting board—in particular formed by a honeycomb core. However, it is also possible for the beam to extend in a manner inserted at least partially into the thickness of the self-supporting board of the one-piece panel. Advantageously, the beam extends in a manner inserted entirely into the thickness of the self-supporting board of the one-piece panel.

Advantageously and according to the invention, the beam extends in contact with a second main face, known as the lower face, opposite the upper face of the self-supporting board.

In a one-piece panel according to the invention the beam(s) extend(s) along that face of the self-supporting board that is opposite the upper face of the one-piece panel, said upper face of the self-supporting board being flat and designed to allow a user to move around on the floor of said transport vehicle. In a one-piece panel according to the invention, the beams do not prevent passengers from moving around but improve the bending strength of the one-piece panel.

Advantageously and according to the invention, the beam has at least one hollow portion having a cross section with a polygonal shape. Advantageously, at least one of the beams has at least one hollow portion having a cross section with a polygonal shape. Advantageously, each beam has at least one hollow portion having a cross section with a trapezoidal shape. Advantageously, the cross section of each hollow portion of the beam has a cross section with a trapezoidal shape. This is then referred to as an "omega-shaped" beam.

Advantageously, the beam may have a cross section with a complex shape. In particular, the beam may have flat lateral extensions that extend approximately in the same plane as the adherent wall and from said adherent wall. In this configuration, each beam has a contact surface with the self-supporting board, the area of which is increased.

Advantageously and according to the invention, the beam has at least one hollow portion having a cross section with a polygonal shape, said hollow portion lying at at least one of the longitudinal ends of said beam.

Advantageously and according to the invention, the beam is in the form of a profiled element. Advantageously, the beam has a cross section with an identical shape—notably a polygonal, in particular trapezoidal, shape—along its entire length. Advantageously, each hollow portion of the beam lies at each end of the beam and at the periphery of the one-piece panel according to the invention.

Advantageously, the beam is formed by one element of the plurality of rigid foam elements that form the rigid core.

Advantageously, and in a first variant according to the invention, each hollow portion lying at the periphery of the one-piece panel has a cross section with a trapezoidal shape and has a wall, known as the adherent wall, that is approximately flat and lies next to and in contact with the rigid core—in particular the honeycomb core—and a wall, known as the free wall, opposite the adherent wall, that is substantially flat and parallel to the adherent wall.

In this first variant according to the invention, each beam of the one-piece panel comprises at each of its ends a hollow portion having two opposite walls that are substantially parallel and form a cavity for mating two adjacent one-piece panels and for fastening the one-piece panels to a structural framework element of the transport vehicle.

Advantageously and according to the invention, each hollow portion forms a housing designed to be able to receive and engage with a dual-function member for fastening at least one one-piece panel to an element—in particular a crossbeam—of the structural framework of the transport vehicle. Such a dual-function fastening member extends over a single beam, in contrast to seat fastening rails of the prior art, which extend over a plurality of adjacent beams. The mounting of a one-piece panel according to the invention by means of such a dual-function fastening member is thus simplified.

Advantageously, it is possible, in a transport vehicle floor formed by one-piece panels according to the invention, for some of these dual-function fastening members to be suitable for fastening a single one-piece panel to the structural framework of the transport vehicle, in particular for fastening panels lying at the periphery of the transport vehicle floor.

Advantageously, the beam comprises a free face having, in cross section, a shape chosen from the group formed by concave shapes, convex shapes and flat shapes.

Advantageously, each hollow portion forms a housing designed to be able to receive and engage with a dual-function member for fastening two adjacent one-piece panels together and for securing the two adjacent one-piece panels to an element—in particular to a crossbeam of an aircraft or of a boat—of the structural framework of the transport vehicle.

Advantageously, in one particular embodiment of a one-piece panel according to the invention, each hollow portion having a cross section with a trapezoidal shape has an at least partially hollowed-out free wall. In this particular embodiment, advantageously and according to the invention, each housing formed in the hollow portion having an at least partially hollowed-out opposite wall is designed to be able to receive at least a part of a dual-function member for fastening two adjacent one-piece panels together and for securing the two adjacent one-piece panels to a structural framework element of the transport vehicle—in particular to a crossbeam of an aircraft.

Advantageously, a one-piece panel according to the invention comprises at least one hollow portion having a cross section with a trapezoidal shape and having an at least partially hollowed-out free wall, said hollow portion being designed to be able to receive a dual-function member for fastening one one-piece panel to a structural framework element of the transport vehicle.

It should be noted that the installation of a one-piece panel according to the invention on the transverse elements of the structural framework of the transport vehicle is easy and only requires that the housing formed in the hollow portion be matched to the dual-function fastening member and that the one-piece panel be fastened to the dual-function fastening member and optionally that the dual-function member be fastened to the structural framework element of the transport vehicle.

Advantageously and according to the invention, each beam is hollow and has an internal space limited by the adherent wall and by the free wall.

Advantageously and according to the invention, the one-piece panel has a plurality of mortises passing through the cabin skin, the rigid core—in particular the honeycomb core—and the adherent wall of the frame, each mortise opening out on one side onto a half-space, known as the upper space, lying toward the outside and next to the cabin skin, and on the other side onto the internal space in the beam. Advantageously, the beam is a hollow beam forming an internal space that communicates with the plurality of mortises in the one-piece panel.

Advantageously and according to the invention, each mortise is designed to be able to receive and engage with a fastening tenon of a fastening member—in particular of a fastening member that forms a fastening yoke—of an item of furniture of the transport vehicle—in particular of an aircraft seat —, said fastening member being designed to be able to engage with the item of furniture of the transport vehicle and to immobilize said item of furniture on the floor of the transport vehicle.

In one particular embodiment of a one-piece panel according to the invention, each mortise in the one-piece panel is designed to be able to receive a fastening tenon, said fastening tenon comprising a locking member designed such that:

in a first position of the fastening tenon and of the locking member, said fastening tenon can be introduced freely into the mortise; and such that in a second position of the fastening tenon and of the locking member, distinct from the first position, the locking member is retained in the mortise and the member for fastening the item of furniture of the transport vehicle is securely held by the one-piece panel.

Advantageously and according to the invention, the mortises of the plurality of mortises are distributed regularly in the main plane of the one-piece panel in at least one group of mortises, the mortises of each group of mortises being aligned next to each beam. Each of the mortises may have a particular shape, in particular a polygonal shape, a circular shape, an oval shape or any other shape in cross section. In particular, each of the mortises may have a cross section with a quadrifid shape, for example a shape with a circular base and four protuberances that have, in pairs, an axis of symmetry perpendicular to the two main faces of the panel.

Furthermore, advantageously and according to the invention, the one-piece panel comprises at least one secondary stiffening element that extends between two consecutive beams of the one-piece panel, perpendicularly to said beams and in contact with the lower face of the self-supporting board. Advantageously, the one-piece panel according to the invention comprises such secondary stiffening elements that are designed to increase the mechanical strength of the one-piece panel—in particular for a use of the one-piece panel in which said one-piece panel supports furniture.

Advantageously and according to the invention, the fastening member is shaped so as to be able to form a secure connection to an item of furniture—in particular a seat—of the transport vehicle and to be able to receive one end, in the form of a screw, of the fastening tenon and to secure the fastening member to the one-piece panel by means of a nut.

Furthermore, advantageously and according to the invention, the dual-function member comprises:

a base designed to be able to rest on and be secured to an element of the structural framework of the transport vehicle; and a part that protrudes from the base and is designed to engage with the hollow portion having a cross section with a polygonal shape at the longitudinal end of said beam so as to substantially immobilize said one-piece panel when the protruding part of the dual-function member engages with said hollow portion.

Likewise, advantageously and according to the invention, the one-piece panel has at least one of the following features:

the one-piece panel has a total thickness of between 7 mm and 40 mm;

the one-piece panel has a longest dimension, known as length, of between 1000 mm and 3000 mm and a width of between 500 mm and 1500 mm;

the one-piece panel has a relative mass of between 4 $kg/m^2$ and 20 $kg/m^2$.

The invention also relates to a method for fastening a fitting to a panel comprising two main faces and at least one mortise passing through said panel and opening out onto the two main faces of said panel, wherein a device according to the invention is used.

Advantageously and according to the invention, in such a method:

a force is exerted on the fastening device so as to place said fastening device in its installation position, in which the clamping jaw and the anchoring jaw are spaced apart with respect to the blocking position and in which the clamping jaw is shaped so as to be able to pass through the mortise in the panel; then said fastening device is introduced in its installation position into one of the mortises in the panel such that the clamping jaw lies next to the opposite face of the panel, and such that the anchoring jaw lies next to the attachment face of the panel; then the fastening device is rotated about its longitudinal axis; then the force is released such that the clamping jaw and the anchoring jaw are returned elastically toward one another by elastic means, and such that the panel and the fastening device are assembled; and the clamping member is assembled with the fitting by fastening means.

The invention also concerns a fastening device and a method for fastening a fitting to a panel, and a panel comprising such a fastening device, characterized in combination by all or some of the features mentioned above or below.

BRIEF DESCRIPTION OF THE FIGURES

Further aims, features and advantages of the invention will become apparent from reading the following description which refers to the appended figures, which show preferred embodiments of the invention, given purely by way of nonlimiting example, and in which:

FIG. 1 is a schematic representation of a fastening device according to the invention in the blocking position, FIG. 2 is a schematic representation of a fastening device according to the invention in the installation position, FIG. 3 is a schematic representation of a fastening device according to the invention in the blocking position, fastening a fitting to a panel, FIG. 5 is an overall perspective view of a one-piece panel that is able to receive a fastening device according to the invention, FIG. 6 is a perspective bottom view with an cutaway view of a detail of a one-piece panel that is able to receive a fastening device according to the invention, FIG. 7 is a perspective top view of a detail of a one-piece panel that is able to receive a fastening device according to the invention.

DETAILED DESCRIPTION

Figure 4:
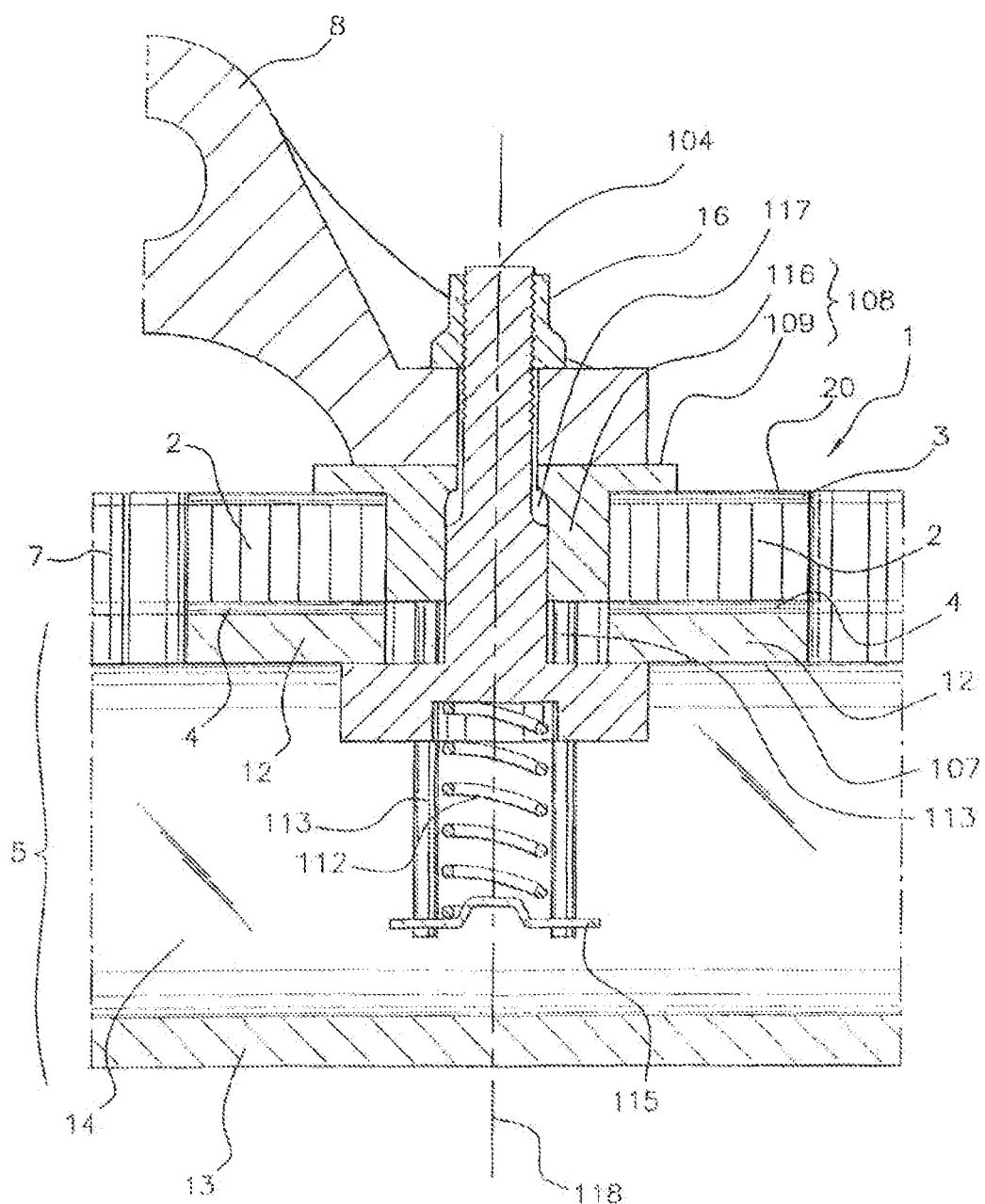
FIG. 4 is a cross-sectional view of a one-piece panel in a plane perpendicular to the one-piece panel and passing through a beam of said panel and comprising a device for fastening a fitting in the blocking position.

A device 100 for fastening a fitting to a panel is shown in FIG. 1 in the blocking position. Such a fastening device 100 comprises an axis 118 of elongation approximately parallel to an axis perpendicular to the two main faces of a panel 1 that receives said fastening device 100. The fastening device 100 is formed by a peg 108 for anchoring the fastening device 100 in the panel, said anchoring peg 108 comprising an anchoring jaw 109, an anchoring support plate 115 and means 113 for guiding a clamping jaw 102, the anchoring peg 108, the anchoring support plate 115 and the guiding means 113 being secured to one another. In the fastening device 100 shown in FIG. 1, the guiding means 113 are formed by guiding rods 113 that extend parallel to one another between the anchoring jaw 109 and an anchoring support plate 115 for the anchoring peg 108. If need be, as shown in FIG. 1, the anchoring peg 108 has an error-proofing feature 116 designed to be able to engage with the walls of a mortise in a panel and to immobilize the anchoring peg 108 and the fastening device 100 in terms of rotation on the panel.

The anchoring support plate 115 for the anchoring jaw 109 has at least one orifice for gripping and extracting the fastening device 100 from the panel. In particular, such orifices are shaped so as to be able to receive a tool for gripping the fastening device 100 in order to extract it. Thus, a fastening device 100 according to the invention is a fastening device 100 which is removable and reusable.

The anchoring peg 108 shown in FIG. 1 comprises an error-proofing body 116 secured to the anchoring jaw 109 and to the anchoring support plate 115 via the guiding rods 113. The error-proofing feature has a hole designed to receive the cylindrical rod 103 and allow the latter to move translationally.

The clamping member 102 of the fastening device 100 is formed by a clamping jaw 105 having a cross section with an approximately quatrefoil shape and by a cylindrical rod 103 that extends along the axis 118 of elongation of the fastening device 100 and is secured to the clamping jaw 105. The cylindrical rod 103 is designed to allow the clamping member 102 to move translationally with respect to the anchoring peg 108 in the hole in the error-proofing feature 116 and the anchoring jaw 109. In the variant shown in FIG. 1, the cylindrical rod 103 has a cross section 121 with a square shape and the hole 117 in the error-proofing feature 116 also has a cross section with a complementary square shape so as to allow the cylindrical rod 103 to move translationally in the hole 117 in the error-proofing feature 116. In this variant, the cylindrical rod 103 of the clamping member 102 and the error-proofing feature 116 secured to the anchoring support plate 115 rotate as one with respect to one another.

The cylindrical rod 103 comprises a terminal end 25 designed to receive and attach a fitting, in particular a bracket for fastening such a fitting. Such a terminal end 25 may comprise attachment means formed by a portion of threaded rod designed to receive an attachment nut.

The fastening device 100 shown in FIG. 1 comprises elastic return means 112 for returning the clamping jaw 105 and the anchoring jaw 109 toward one another. In the blocking position of the fastening device 100 shown in FIG. 1, the clamping jaw and the anchoring jaw 109 are in the position in which they have been moved toward one another.

A fastening device 100 in the installation position is shown in FIG. 2. A fastening device 100 in the installation position is obtained by exerting a compressive force on the clamping member 102 of the assembly device 100. In this installation position, the jaw 105 of the clamping member 102 and the jaw 109 of the anchoring peg 108 are spaced apart from one another. In this installation position, the fastening device 100 is shaped such that:

the clamping jaw 105 can be introduced translationally into a mortise 7 in a panel 1 so as to cause said clamping jaw 105 to emerge on the outside of the panel 1 and from the opposite face 30 thereof;

the anchoring jaw 109 and the error-proofing feature 116 lie outside the panel 1 and on the attachment face 20 thereof; and such that the anchoring peg 108 and the clamping member 102 that rotates as one with the anchoring peg 108 can be rotated such that the clamping jaw 105 is prevented from passing through the mortise 7 in the panel 1, said clamping jaw 105 remaining blocked on the opposite face 30 of the panel, and such that an alignment of the error-proofing feature 116 with the mortise 7 is obtained.

Releasing the compressive force exerted on the clamping member 102 allows the clamping jaw 105 and the anchoring jaw 109 to be elastically returned and moved toward one another and allows the fastening device 100 to be fastened to the panel by clamping.

A device 100 for fastening a fastening member 8 to a panel 1 is shown in FIG. 3. The panel 1 has an upper or accessible face 20 and a blind or opposite face 30. Such a panel has a plurality of mortises 7 that pass through said panel 1 and open onto each of the upper face 20 and opposite face 30. The mortises 7 of the plurality of mortises are aligned on the two main faces of the panel 1. This variant of a panel 1 that is equipped with two fastening devices 100 according to the invention and is shown in FIG. 3 allows a yoke 8 for fastening an aircraft seat to be fastened. The fastening yoke 8 lies next to two mortises 7 that accommodate two fastening devices 100 according to the invention. Each fastening device 100 has an anchoring jaw 109 that lies in contact with the panel 1 and in contact with the fastening yoke 8. Each fastening device 100 also has a clamping member 102 having a cylindrical rod 103 of which the end that emerges from the upper face 20 of the panel 1 has means 104 for securing the clamping member 102 to the yoke 8, said securing means 104 being formed by a threaded rod 104 and a complementary nut 16.

A device 100 for fastening a fastening yoke 8 in the blocking position to a panel 1 is shown in longitudinal section in FIG. 4. The panel 1 comprises a self-supporting board 2 and a beam 5 for stiffening said self-supporting board 2. The panel 1 has mortises 7 that pass through the self-supporting board 2 and the adherent wall 12 of the hollow beam 5. Said hollow beam 5 has a free wall 13 in longitudinal section, the adherent wall 13 and free wall 13 delimiting an internal space 14 of the beam 5.

In this blocking position of the fastening device 100, the error-proofing feature 116 of the anchoring peg 108 is inserted into the mortise 7 in the panel 1, the anchoring jaw 109 of the anchoring peg 108 extending from the fastening face 20 of the panel 1 and the clamping jaw 105 of the clamping member 102 bearing against the opposite face 30 of the panel 1 by way of the lobes 120 of the quatrefoil clamping jaw 105. In this blocking position, the anchoring jaw 105 lies in abutment against the accessible attachment face 20 of the self-supporting board 2 and the clamping jaw 105 lies in contact with and in abutment against the internal face 107 of the adherent wall 12 of the beam 5 by way of the lobes 120 of the quatrefoil clamping jaw 105. The elastic return means 112 exert a clamping force on the clamping jaw 105 and on the anchoring jaw 109 such that the fastening device 100 is fastened to the panel 1.

In this blocking position, the member 8 for fastening a fitting is fastened to the fastening device 100 by means of a nut 16 screwed onto the end 104 of the cylindrical rod 103 of the clamping member 102. The clamping of the nut 16 on the clamping member 102 allows complementary clamping of the clamping jaw 105 and of the anchoring jaw 109 to the panel 1.

A one-piece panel 1 designed to be able to receive a fastening device 100 according to the invention is shown in FIG. 5. Such a one-piece panel 1 is positioned on two approximately parallel structural framework crossbeams 9 of a transport vehicle and rests on said crossbeams 9. Such a one-piece panel 1 comprises a self-supporting board 2 comprising a honeycomb core 2 and having a lower face 30 lying next to the crossbeams 9, and an upper face 20 opposite the lower face is designed to allow the movement of users of and/or travelers on the transport vehicle. The upper face 20 of the honeycomb core 2 is covered with a skin, known as the cabin skin 3.

In a first embodiment (not shown) of a one-piece panel 1 according to the invention, it is possible for the honeycomb core also to have an additional comfort covering on its upper face, said comfort covering being formed by a mat, a carpet, or any other covering that is suitable for improving the comfort—in particular the acoustic comfort—of passengers on the transport vehicle.

A one-piece panel 1 according to the invention may also have, on its lower face 30, a skin, known as the lower skin 4, designed to improve the mechanical bending strength of the one-piece panel 1 in one of its main directions of elongation. However, it is possible for a one-piece panel 1 not to have such a lower skin 4 and for the stiffening beams 5 to lie directly in contact with the lower face 30 of the honeycomb core 2.

Such stiffening beams 5 are produced integrally with the honeycomb core 2, if need be with the lower skin 4 of said honeycomb core 2. In any event, the beams 5 are produced so as to be inseparable from the honeycomb core 2 without damaging the one-piece panel 1.

The installation of a one-piece panel 1 in a transport vehicle does not in any way require the prior positioning of rails designed to hold said one-piece panel 1 and to guide seats and/or furniture with which the cabin of the transport vehicle is fitted.

A one-piece panel 1 also has mortises 7 passing through it that are designed to be able to engage with an element 8 for fastening a seat and/or an item of furniture and to secure this fastening element 8 to the upper face 20 of the one-piece panel 1. Advantageously, the mortises 7 are distributed in the plane of the one-piece panel 1 so as to form alignments 17 of mortises 7 that are designed to be able to secure at least one row of seats in the transport vehicle. Each alignment 17 of mortises 7 preferably lies next to a beam 5. In this configuration, the forces associated with the seats and furniture are transferred directly to the beams 5.

Thus, a one-piece panel 1 has an upper face 20 which is perfectly flat and designed to allow users and/or passengers to move around in the transport vehicle.

Such a one-piece panel 1 makes it possible for a transport vehicle to be equipped with a plurality of one-piece panels 1 according to the invention, each panel 1 of the plurality of one-piece panels 1 having identical dimensions.

A detail of a one-piece panel 1 is shown in a bottom view with a cutaway in FIG. 6. The one-piece panel 1 comprises a self-supporting board 2 formed by a honeycomb core 2, a cabin skin 3 extending on and against the upper face 20 of the honeycomb core 2, and a lower skin 4 extending at the surface, in contact with and secured to the lower face 30 of the honeycomb core 2. The honeycomb core 2 is of a type known per se to a person skilled in the art, that is to say having different thicknesses according to the desired applications, different shapes of pores or cells 19—in particular having a hexagonal section—and different materials.

Such a one-piece panel 1 has a beam 5 secured to the self-supporting board 2, said beam lying in contact with the lower skin 4. The beam 5 has a hollow portion 6 at its longitudinal end. Advantageously, the beam 5 is hollow along its entire length. The hollow portion 6 of the beam 5 has a wall 12 adherent to the lower skin 4 of the one-piece panel 1 and of which a first face lies in contact with the lower skin 4 of the self-supporting board 2 and of which the face opposite said first face lies next to an internal space 14 of the beam 5. The hollow portion 6 of the beam 5 also has a free wall 13 of which one face lies next to the internal space 14. The adherent wall 12 and free wall 13 define the internal space 14 that forms a housing 11 designed to receive a dual-function member 10 for fastening two adjacent one-piece panels 1 and for securing them to a crossbeam 9 of the transport vehicle. Such a hollow portion 6 has at least one end formed by hollowing out, cut out of the free face 13 of the beam 5.

The one-piece panel 1 shown in FIG. 6 has at least one mortise 7 designed to receive a fastening tenon of a member 8 for fastening a seat to the upper face 20 of the one-piece panel 1 or a device for fastening a fitting according to the invention. The one-piece panel 1 also has a recess 21 designed to receive a shim 22 and to embed said shim in the thickness of the self-supporting board 2. Such a shim 22 is designed to be able to engage with two adjacent one-piece panels 1 and to secure them to a crossbeam 9 of the transport vehicle.

The one-piece panel 1 shown in FIG. 6 also has two bores 23 for fastening the beam 5 of the one-piece panel 1 to the dual-function member 10 by means of screws 24 when the dual-function member 10 is inserted into the housing 11 in the beam 5.

A detail of a one-piece panel 1 according to a first variant of the invention, of a dual-function member 10 for fastening two adjacent one-piece panels 1 and of a member 8 for fastening a seat or a piece of furniture is shown in an exploded top view in FIG. 7. In this first variant, the one-piece panel 1 comprises a cabin skin 3 that extends over and against the upper face 20 of the self-supporting board 2, a lower skin 4 that extends under the lower face 30 of the self-supporting board 2, and a beam 5. The one-piece panel 1 has a recess 21 designed to be able to receive one of the ends of a shim 22, said shim 22 having two bores 29 complementary to the two bores 23 in the beam 5. The hollow portion 6 lying at the end of the beam 5 of the one-piece panel 1 is shaped so as to have a housing 11 that is able to engage with the dual-function member 10, forming a shoe 10.

Such a shoe 10 has a sole 39 that is designed to be able to rest on a crossbeam 9 of the transport vehicle and to be able to be secured to this crossbeam 9. The shoe 10 also comprises a protruding part 40 shaped so as to be able to engage with the housing 11 in the beam 5 and to be able to limit, or even prevent, transverse and/or longitudinal movements of the one-piece panel 1 with respect to the shoe 10 and the crossbeams 9. To this end, the protruding part 40 has fastening bores 31 that are designed to receive the screws 24. The shoe 10 shown in FIG. 7 is fitted with a tapped counter-plate 28 lying inside the hole 32 in the shoe 10, said tapped plate 28 forming a plurality of nuts 33 and being shaped so as to present a nut 33 opposite each fastening bore 31 of the shoe 10. In particular, the shoe 10 has a screw 27 for pre-positioning the tapped counter-plate 28 inside the hole 32 in the shoe 10. Thus, each nut 33 of the tapped counter-plate 28 is positioned so as to be able to receive the screw 24 for fastening the fastening member 8 forming a bracket 8, the shim 22, the one-piece panel 1 and the dual-function member 10 forming a shoe together.

The one-piece panel 1, the shim 22 and, if need be, the fastening member 8 are secured to the dual-function member 10, when the one-piece panel 1 is positioned and forms the floor of a transport vehicle, by means of screws 24 that pass through the one-piece panel 1, the shim 22 and, if need be, the fastening member 8.

Figure 8:
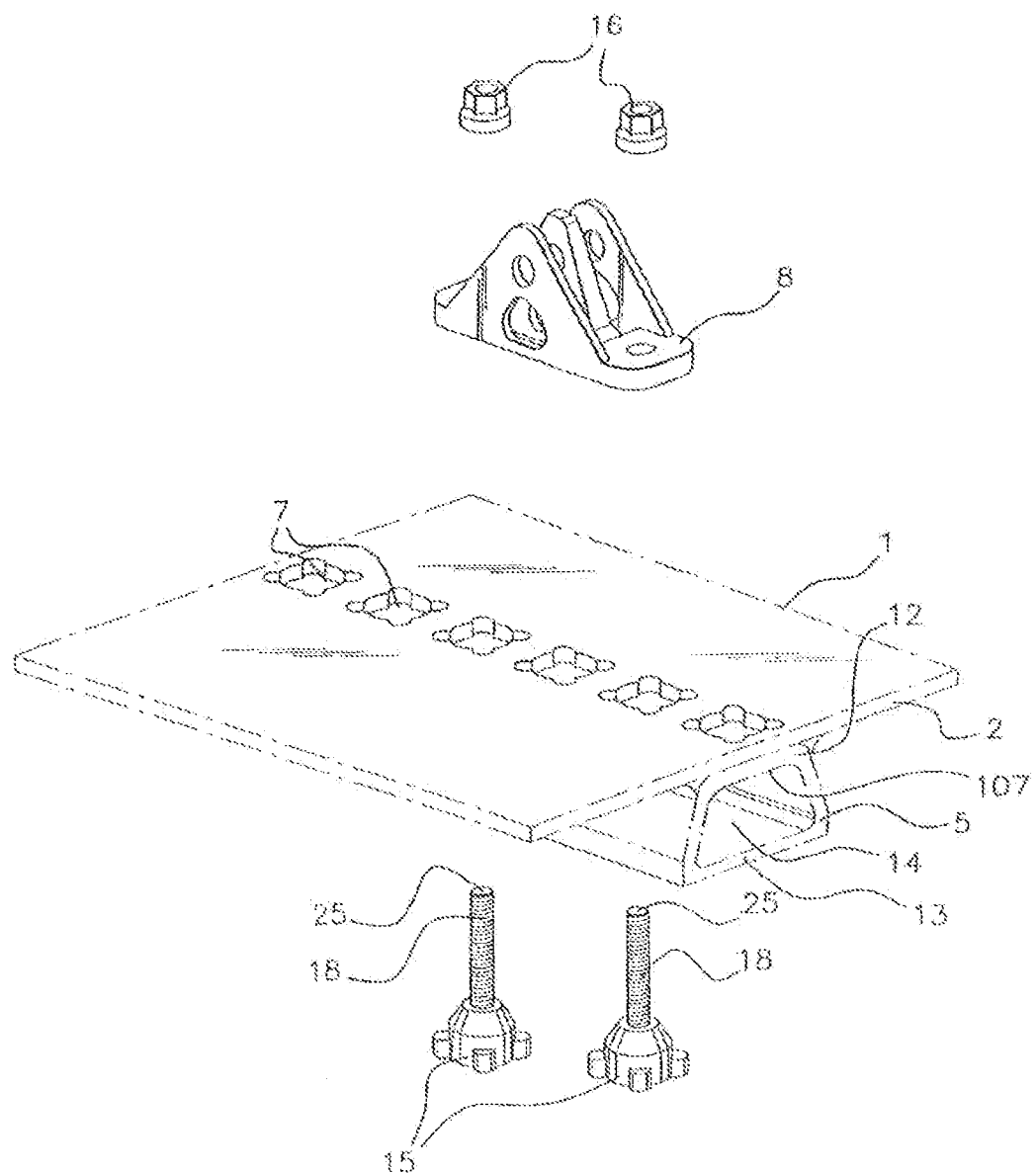
FIG. 8 is a view of a detail of a one-piece panel in combination with a seat and/or furniture fastening device according to the invention.

A second variant of a one-piece panel 1 according to the invention that is equipped with a fastening member 8 is shown in FIG. 8. In this second variant, the one-piece panel 1 has a plurality of mortises 7 that are plumb with a beam 5 of the one-piece panel 1, said mortises 7 being designed to be able to receive and secure tenons 15 for fastening the seat and/or the item of furniture. The mortises 7 and the fastening tenons 15 are respectively shaped such that, in a first relative position of the mortises 7 and the fastening tenons 15, the fastening tenons 15 can be inserted into the interior of the mortises 7, and such that, in a second relative position of the mortises 7 and the fastening tenons 15, the latter are retained in the mortises 7 and a fastening member 8 can be secured to the one-piece panel 1 by means of the fastening tenons 15 and nuts 16 that are designed to be able to be engaged with the end 25 of a threaded rod 18 of the fastening tenons 15.

Of course, this description is given only by way of illustrative example and a person skilled in the art may envision numerous modifications, variants and applications without departing from the scope of the invention, for example by changing the number of beams and/or the dimensions of the self-supporting board and/or applying it to other transport vehicles.

The invention claimed is:

1. A device (100) for fastening a fitting to an attachment face (20) of a panel (1) comprising at least one mortise (7) that passes through the panel (1) and opens out onto said attachment face (20), and an opposite face (30), that lies on the opposite side from the attachment face (20), the fastening device (100) comprising:

a longitudinal axis (118);

a clamping member (102) comprising a clamping jaw (105), which is shaped to pass through the mortise (7) translationally along the longitudinal axis (118) and to bear against the opposite face (30) following rotation about the longitudinal axis (118), and comprising a device (104) for attaching the fitting (101) to the attachment face (20); and a peg (108) for anchoring the fastening device (100) in the panel (1), said peg (108) rotating as one with the clamping member (102) about the longitudinal axis (118) of the fastening device (100) and comprising an anchoring jaw (109), which is designed to be able to bear against the attachment face (20);

said clamping member (102) being designed to be able to be moved translationally with respect to the anchoring peg (108) along the longitudinal axis (118) between:

a blocking position of the fastening device (100), in which the clamping jaw (105) and the anchoring jaw (109) have been moved toward one another by an elastic return device (112) and are in contact with two main faces of the panel (1);

an installation position of the fastening device (100), in which the clamping jaw (105) and the anchoring jaw (109) have been spaced apart from one another with respect to the blocking position, so as to allow the fastening device (100) to rotate about the longitudinal axis (118);

wherein the anchoring peg (108) comprises an error-proofing feature (116) for guiding the anchoring peg (108) into the mortise (7), extending from the face of the anchoring jaw (109), rotating as one with anchoring jaw (109) and facing the clamping jaw (105), said error-proofing feature (116) having a hole (117) that coaxially extends the bore in the anchoring jaw (109) and is designed to receive the cylindrical rod (103) of the clamping member (102) and to allow said cylindrical rod (103) to move between the blocking position and the installation position of the fastening device (100); and wherein the clamping jaw (105) and the error-proofing feature (116) have a quatrefoil external contour in cross section.

2. The device as claimed in claim 1, wherein the clamping member (102) comprises a cylindrical rod (103) passing through a bore in the anchoring jaw (109) and having a first longitudinal end (104) that protrudes from the anchoring peg (108) at least in the blocking position of the fastening device (100), said first longitudinal end (104) being designed to allow said fitting (101) to be fastened to the panel (1), the clamping jaw (105) being secured to the cylindrical rod (103) and lying at a second longitudinal end (106) of the cylindrical rod (103).

3. The device as claimed in claim 2, wherein the bore in the anchoring jaw (109) is designed to receive the cylindrical rod (103) of the clamping member (102) and to allow said cylindrical rod (103) to move translationally in the bore in the anchoring jaw (109) between the blocking position and the installation position of the fastening device (100).

4. The device as claimed in claim 2, wherein the first longitudinal end (104) of the cylindrical rod (103) is a threaded rod (104).

5. The device as claimed in claim 1, wherein the anchoring peg (108) comprises a guiding device (113) for guiding the clamping jaw (105) translationally between the blocking position and the installation position of the fastening device (100).

6. The device as claimed in claim 1, wherein the anchoring jaw (109) is formed by an anchoring support plate (115), for bearing against the attachment face (20) of the panel (1) when the fastening device (100) is in the blocking position, and in that the error-proofing feature (116) has a cylindrical shape and, in cross section perpendicular to the longitudinal axis (118) of the fastening device (100), has an external contour inscribed in a mortise (7) in the panel (1).

7. The device as claimed in claim 1, wherein the error-proofing feature (116) has an external envelope shaped to be able to engage in movement in the mortise (7) perpendicularly to the two main faces of the panel (1) and to be able to prevent the fastening device (100) from rotating with respect to the panel (1) about an axis perpendicular to the two main faces of the panel (1).

8. A device (100) for fastening a fitting to an attachment face (20) of a panel (1) comprising at least one mortise (7) that passes through the panel (1) and opens out onto said attachment face (20), and an opposite face (30), that lies on the opposite side from the attachment face (20), the fastening device (100) comprising:
 a longitudinal axis (118);
 a clamping member (102) comprising a clamping jaw (105), which is shaped to pass through the mortise (7) translationally along the longitudinal axis (118) and to bear against the opposite face (30) following rotation about the longitudinal axis (118), and comprising a device (104) for attaching the fitting (101) to the attachment face (20);
 a peg (108) for anchoring the fastening device (100) in the panel (1), said peg (108) rotating as one with the clamping member (102) about the longitudinal axis (118) of the fastening device (100) and comprising an anchoring jaw (109), which is designed to be able to bear against the attachment face (20);
 said clamping member (102) being designed to be able to be moved translationally with respect to the anchoring peg (108) along the longitudinal axis (118) between:
 a blocking position of the fastening device (100), in which the clamping jaw (105) and the anchoring jaw (109) have been moved toward one another by an elastic return device (112) and are in contact with two main faces of the panel (1);
 an installation position of the fastening device (100), in which the clamping jaw (105) and the anchoring jaw (109) have been spaced apart from one another with respect to the blocking position so as to allow the fastening device (100) to rotate about the longitudinal axis (118);
 wherein the anchoring peg (108) comprises a guiding device (113) for guiding the clamping jaw (105) translationally between the blocking position and the installation position of the fastening device (100); and
 wherein the guiding device (113) comprises guiding rods (113) that extend between the clamping jaw (105) and the holder for the anchoring peg (108).

9. The device as claimed in claim 8, wherein the elastic device (112) comprises at least one compression spring (112) that extends between the holder for the anchoring peg (108) and the clamping jaw (105) of the clamping member (102).

10. A device (100) for fastening a fitting to an attachment face (20) of a panel (1) comprising at least one mortise (7) that passes through the panel (1) and opens out onto said attachment face (20), and an opposite face (30), that lies on the opposite side from the attachment face (20), the fastening device (100) comprising:
 a longitudinal axis (118);
 a clamping member (102) comprising a clamping jaw (105), which is shaped to pass through the mortise (7) translationally along the longitudinal axis (118) and to bear against the opposite face (30) following rotation about the longitudinal axis (118), and comprising a device (104) for attaching the fitting (101) to the attachment face (20);
 a peg (108) for anchoring the fastening device (100) in the panel (1), said peg (108) rotating as one with the clamping member (102) about the longitudinal axis (118) of the fastening device (100) and comprising an anchoring jaw (109), which is designed to be able to bear against the attachment face (20);
 said clamping member (102) being designed to be able to be moved translationally with respect to the anchoring peg (108) along the longitudinal axis (118) between:
 a blocking position of the fastening device (100), in which the clamping jaw (105) and the anchoring jaw (109) have been moved toward one another by an elastic return device (112) and are in contact with two main faces of the panel (1);
 an installation position of the fastening device (100), in which the clamping jaw (105) and the anchoring jaw (109) have been spaced apart from one another with respect to the blocking position so as to allow the fastening device (100) to rotate about the longitudinal axis (118);
 wherein the anchoring peg (108) comprises an error-proofing feature (116) for guiding the anchoring peg (108) into the mortise (7), extending from the face of the anchoring jaw (109), rotating as one with the anchoring jaw (109) and facing the clamping jaw (105), said error-proofing feature (116) having a hole (117) that coaxially extends the bore in the anchoring jaw (109) and is designed to receive the cylindrical rod (103) of the clamping member (102) and to allow said cylindrical rod (103) to move between the blocking position and the installation position of the fastening device (100); and
 said clamping jaw (105) and said error-proofing feature (116) having an identical external contour in cross section with respect to the axis (118) of elongation of the fastening device (100) and approximately parallel to an axis perpendicular to the two main faces of the panel (1).

11. The device as claimed in claim 10, wherein the clamping jaw (105) and the error-proofing feature (116) have contours that differ from one another by rotation through a non-zero angle when their cross sections are projected on a plane at right angles to the longitudinal axis of the cylindrical rod (103).

* * * * *